(12) United States Patent
Jain et al.

(10) Patent No.: US 11,201,930 B2
(45) Date of Patent: *Dec. 14, 2021

(54) SCALABLE MESSAGE PASSING ARCHITECTURE IN A CLOUD ENVIRONMENT

(71) Applicant: Citrix Systems, Inc., Fort Lauderdale, FL (US)

(72) Inventors: Ayush Jain, North Lauderdale, FL (US); Jason-Lee Thomas, Fort Lauderdale, FL (US); Alexandr Smelov, North Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/942,098

(22) Filed: Jul. 29, 2020

(65) Prior Publication Data
US 2020/0358861 A1 Nov. 12, 2020

Related U.S. Application Data

(63) Continuation of application No. 16/160,337, filed on Oct. 15, 2018, now Pat. No. 10,771,570.

(51) Int. Cl.
| | | |
|---|---|---|
| H04L 29/08 | (2006.01) |
| H04L 12/911 | (2013.01) |
| H04L 12/927 | (2013.01) |
| H04L 12/24 | (2006.01) |
| H04L 29/06 | (2006.01) |

(Continued)

(52) U.S. Cl.
CPC ............. H04L 67/16 (2013.01); H04L 67/10 (2013.01)

(58) Field of Classification Search
CPC ................................ H04L 67/16; H04L 67/10
USPC ........................................................ 709/223
See application file for complete search history.

(56) References Cited

U.S. PATENT DOCUMENTS

| | | | | |
|---|---|---|---|---|
| 5,966,531 A | * | 10/1999 | Skeen | G06F 3/0481 719/315 |
| 8,589,495 B1 | | 11/2013 | Beckert | |
| 8,832,304 B2 | | 9/2014 | Traynor | |

(Continued)

OTHER PUBLICATIONS

Jan. 2, 2020—U.S. Non-final Office Action—U.S. Appl. No. 16/160,337.
May 29, 2020—U.S. Notice of Allowance—U.S. Appl. No. 16/160,337.

*Primary Examiner* — David R Lazaro
*Assistant Examiner* — Berhanu Shitayewoldetadik
(74) *Attorney, Agent, or Firm* — Banner & Witcoff, Ltd.

(57) ABSTRACT

Methods, systems, and computer-readable media for creating and managing a multi-tiered service messaging architecture within a cloud service provider or computing environment. In one or more embodiments, the multi-tiered service messaging architecture may comprise a primary topic configured to receive and manage particular service messages. Services of the cloud are allocated a service topic to receive the service messages managed by the primary topic and may itself subscribe to the primary topic to receive the service messages. Through the subscription to the service topic, the service may receive the service messages provided by the primary topic. Still other sub-topics may subscribe to the service topics for additional subscriptions by services to receive the service messages provided by the primary topic.

20 Claims, 9 Drawing Sheets

(51) Int. Cl.
*G06F 15/16* (2006.01)
*G06N 5/04* (2006.01)

(56) References Cited

U.S. PATENT DOCUMENTS

| | | |
|---|---|---|
| 10,257,673 B1 | 4/2019 | Smith et al. |
| 10,361,985 B1 | 7/2019 | Shveykin et al. |
| 2003/0046395 A1 | 3/2003 | Fleming et al. |
| 2005/0021622 A1* | 1/2005 | Cullen .................... H04L 45/00 709/204 |
| 2006/0047666 A1 | 3/2006 | Bedi et al. |
| 2006/0069587 A1 | 3/2006 | Banks et al. |
| 2008/0133541 A1 | 6/2008 | Fletcher et al. |
| 2008/0189774 A1 | 8/2008 | Ansari et al. |
| 2009/0092055 A1 | 4/2009 | Balasubramanian et al. |
| 2010/0306599 A1 | 12/2010 | Cota-Robles et al. |
| 2011/0028135 A1 | 2/2011 | Srinivasan |
| 2011/0087796 A1 | 4/2011 | Littlejohn et al. |
| 2011/0173324 A1 | 7/2011 | Wang et al. |
| 2011/0219138 A1* | 9/2011 | Cho .................... H04L 65/607 709/231 |
| 2011/0295970 A1 | 12/2011 | Miyazawa |
| 2012/0159246 A1 | 6/2012 | Paramasivam et al. |
| 2013/0024567 A1 | 1/2013 | Roxburgh et al. |
| 2013/0054759 A1 | 2/2013 | Lim et al. |
| 2013/0060928 A1 | 3/2013 | Shao |
| 2013/0336294 A1 | 12/2013 | Dinan |
| 2013/0336295 A1 | 12/2013 | Dinan |
| 2014/0040975 A1 | 2/2014 | Raleigh et al. |
| 2014/0094212 A1 | 4/2014 | Ahn et al. |
| 2014/0137188 A1 | 5/2014 | Bartholomay et al. |
| 2014/0211665 A1 | 7/2014 | Voccio et al. |
| 2014/0258412 A1 | 9/2014 | Li et al. |
| 2014/0321272 A1* | 10/2014 | Bangolae ................ H04L 43/16 370/230 |
| 2015/0012660 A1 | 1/2015 | Kuulusa |
| 2015/0019618 A1 | 1/2015 | Brookfield |
| 2015/0089569 A1 | 3/2015 | Sondhi et al. |
| 2015/0242501 A1* | 8/2015 | Guild .................... G06F 3/0482 707/740 |
| 2015/0281078 A1 | 10/2015 | Luo et al. |
| 2015/0350139 A1 | 12/2015 | Speer et al. |
| 2016/0028737 A1 | 1/2016 | Srinivasan et al. |
| 2016/0072865 A1 | 3/2016 | Kaplinger et al. |
| 2016/0234078 A1 | 8/2016 | Jana et al. |
| 2016/0260157 A1 | 9/2016 | Krook et al. |
| 2017/0063946 A1 | 3/2017 | Quan et al. |
| 2017/0063969 A1 | 3/2017 | Franks |
| 2017/0074070 A1 | 3/2017 | Hay |
| 2017/0193003 A1 | 7/2017 | Vijayan et al. |
| 2017/0373860 A1 | 12/2017 | Kshirsagar et al. |
| 2018/0109453 A1 | 4/2018 | Dong et al. |
| 2018/0276085 A1 | 9/2018 | Mitkar et al. |
| 2018/0307403 A1 | 10/2018 | St-Jean et al. |
| 2018/0367631 A1 | 12/2018 | Son et al. |
| 2019/0108261 A1 | 4/2019 | Hashemi et al. |

* cited by examiner

SCALABLE MESSAGE PASSING ARCHITECTURE IN A CLOUD ENVIRONMENT

RELATED APPLICATION

This application claims priority to U.S. patent application Ser. No. 16/160,337, filed Oct. 14, 2018, the entire disclosure of which is hereby incorporated herein by reference.

FIELD

Aspects described herein generally relate to computers, networking, hardware, and software. In particular, one or more aspects of the disclosure generally relate to computer hardware and software for cloud hosting and managing data, messaging, and communications between services of the cloud environment.

BACKGROUND

Many enterprises (e.g., corporations, partnerships, governments, academic institutions, other organizations, etc.) are now using virtualization and clouds of computing resources to fulfill their information technology and computing needs. Cloud computing is a network-based computing environment in which computing resources are provided to many users through the network. Cloud service providers can deliver cloud-based computing services (e.g., Infrastructure-as-a-Service (IaaS), Platform-as-a-Service (PaaS), Software-as-a-Service (SaaS), and storage services) by providing the ability to create virtual servers on demand that are configured to perform particular functions for the requesting enterprise. In general, cloud computing environments may be public (or external to a company), private (or internal to a company), or a combination of both public and private.

Services provided by cloud service providers may communicate with other services provided by the cloud. For example, a first service may generate one or more messages or updates resulting from the functions performed by the first service. These messages may summarize or otherwise include information about the execution of the first service, such as databases that are updated by the first service, information stored in the database by the first service, workloads completed, status of an ongoing workloads, etc. Other services provided by the cloud service provider may utilize the service messages from a first service to perform other functions for the enterprise. For example, a second service may perform a function, but only after completion of a function by the first service. The second service may receive service messages from the first service and monitor for a completion service message indicating that the function of the first service is completed. Upon receiving the completion service message, the second function may then perform its own functions. Therefore, distributing service messages within a cloud service provider may aid the provider and services in performing certain functions.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a data processing system comprising a cloud management server and a service management server. The cloud management server may include a primary service messaging buffer configured to transmit service messages of a first service of a cloud service provider to one or more primary subscriptions of the primary service messaging buffer. The service management server may include at least one secondary service messaging buffer subscribed to the primary service messaging buffer via a corresponding primary subscription of the one or more primary subscriptions. The at least one secondary service messaging buffer may be configured to transmit the service messages received from the primary service messaging buffer to one or more service subscriptions of the at least one secondary service messaging buffer and wherein the at least one secondary service messaging buffer corresponds to a second service of the cloud service provider. In addition, the second service may receive the service messages from the at least one secondary service messaging buffer via a corresponding service subscription of the one or more service subscriptions.

Other aspects described herein are directed towards a method include the operation of generating, at a cloud management server, a primary buffer configured to transmit service messages of a first service of a cloud service provider via one or more primary subscriptions of the primary buffer, receiving a request from a second service of the cloud service provider to receive the service messages of the first service, and generating, at a service management server associated with the second service, at least one service buffer configured to transmit service messages received from the primary buffer via one or more service subscriptions of the service buffer. The method may further include subscribing, via a first of the one or more primary subscriptions, the service buffer to the primary buffer and transmitting a subscribe instruction to the service management server to subscribe the second service to the service buffer via a first of the one or more service subscriptions of the service buffer.

Still other aspects described herein are directed towards one or more non-transitory computer-readable media storing computer-executable instructions that, when executed by a computer system comprising at least one processor, and least one memory, cause the computer system to perform a method. Operations of the performed method may include instantiating, at a cloud management server, a primary buffer configured to transmit service messages of a first service of a cloud service provider via one or more primary subscriptions of the primary buffer in response to receiving a request from a second service of the cloud service provider and instantiating, at a service management server associated with the second service, at least one service buffer configured to transmit received service messages to the second service via one or more service subscriptions of the service buffer. The method may also include generating a communication session, via a first of the one or more primary subscriptions, between the service buffer and the primary buffer and transmitting a subscribe instruction to the service management server to subscribe the second service to the service buffer via a first of the one or more service subscriptions of the service buffer.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a service messaging architecture for a cloud service provider or computing environment. The service messaging architecture may utilize service message topics that receive and manage particular service messages. Entities, such as services themselves or other topics, may subscribe to the topics to receive the service messages managed by the topic. In one implementation, topics may be arranged in a tiered-structure with topics adopting a primary-secondary relationship. For example, a primary topic may manage service messages from a particular service provided by the cloud service provider. Secondary topics, also referred to as service topics, may subscribe to the primary topic to receive the service messages. Services requesting to receive the service messages may be allocated to a service topic and subscribe to the associated service topic that is itself subscribed to the primary topic. Through the subscription to the service topic, the service may receive the service messages provided by the primary topic. Still other sub-topics may subscribe to the service topics for additional subscriptions by services to receive the service messages provided by the primary topic. Access keys for subscribing to the topics of the architecture may be generated such that subscribes to a topic share an access key. Through the multi-tiered service architecture, security of access keys is maintained to the services sharing a service topic. Various other advantages over other service messaging architectures of cloud service providers are realized through the multi-tiered service messaging architecture, as explained in greater detail below.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
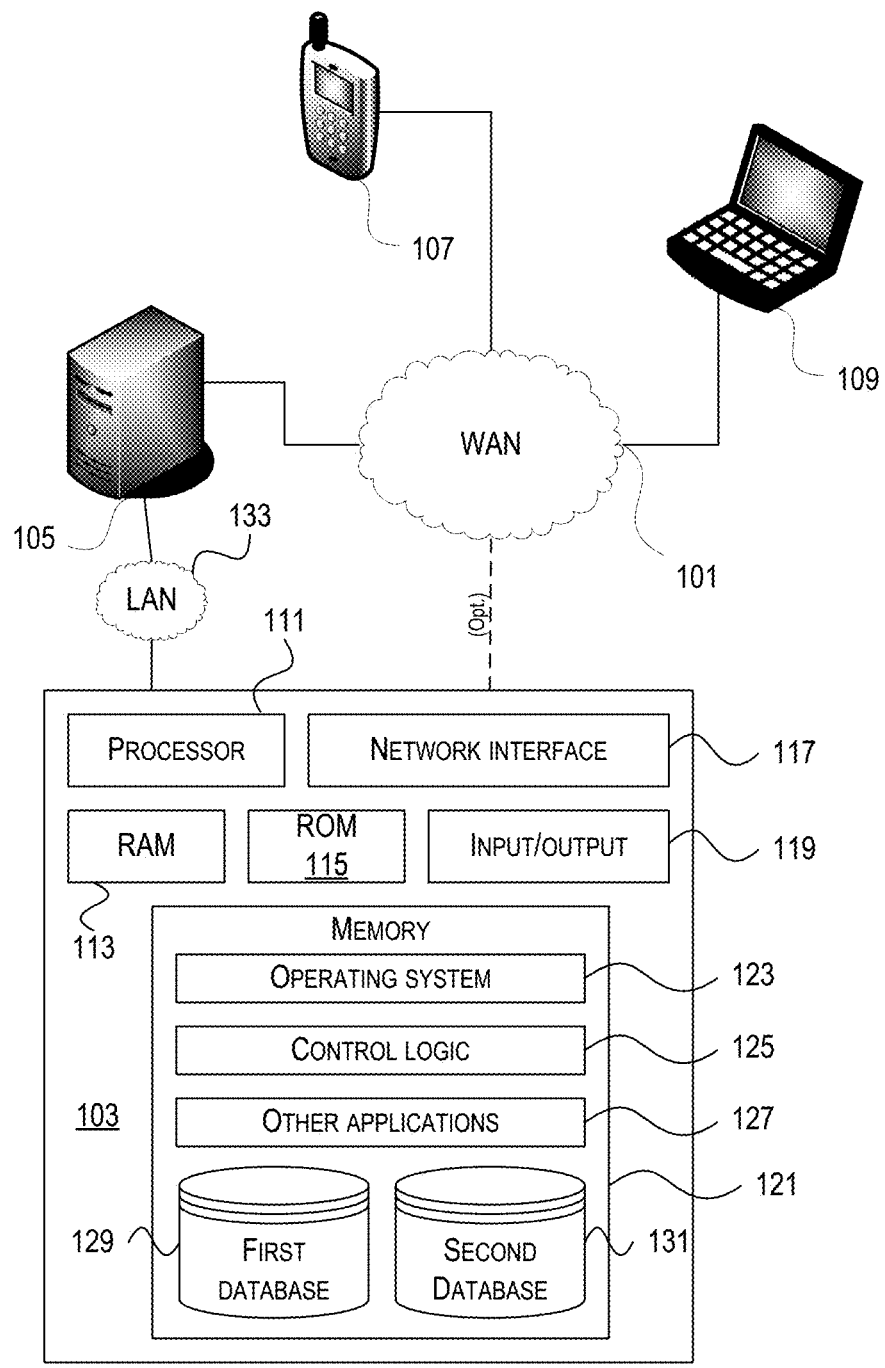
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
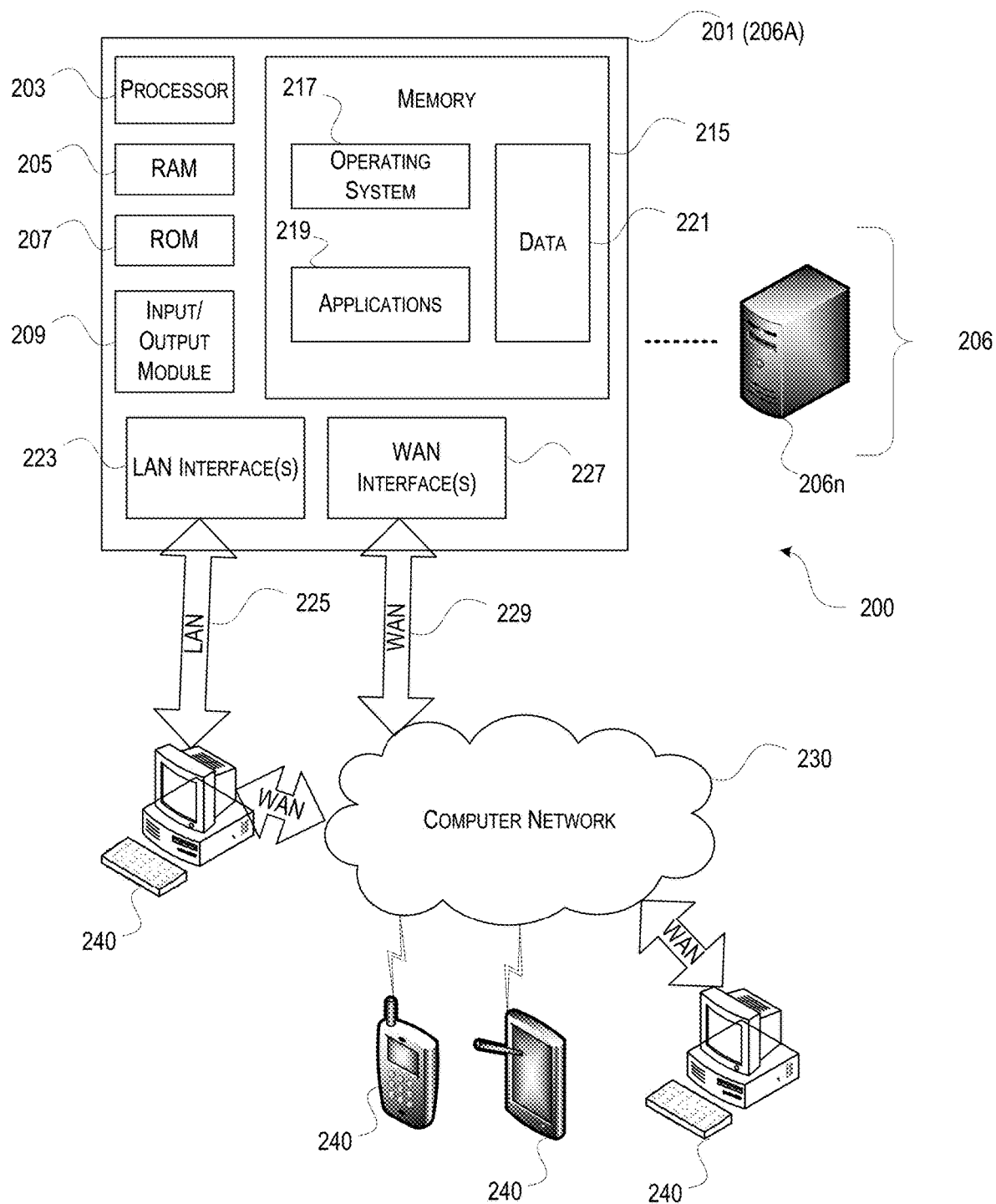
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206$a$ in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223.

When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a primary application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
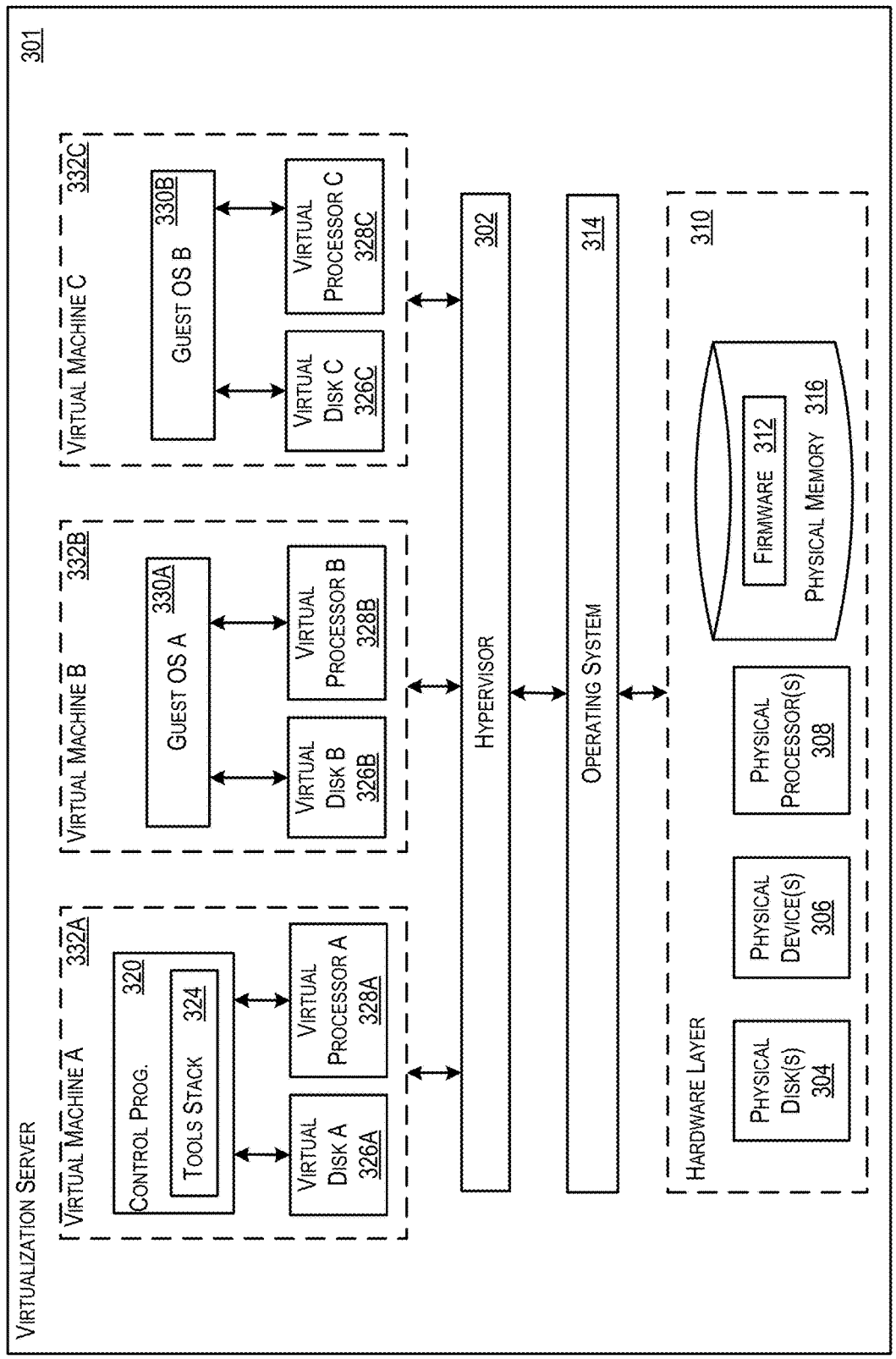
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server

301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
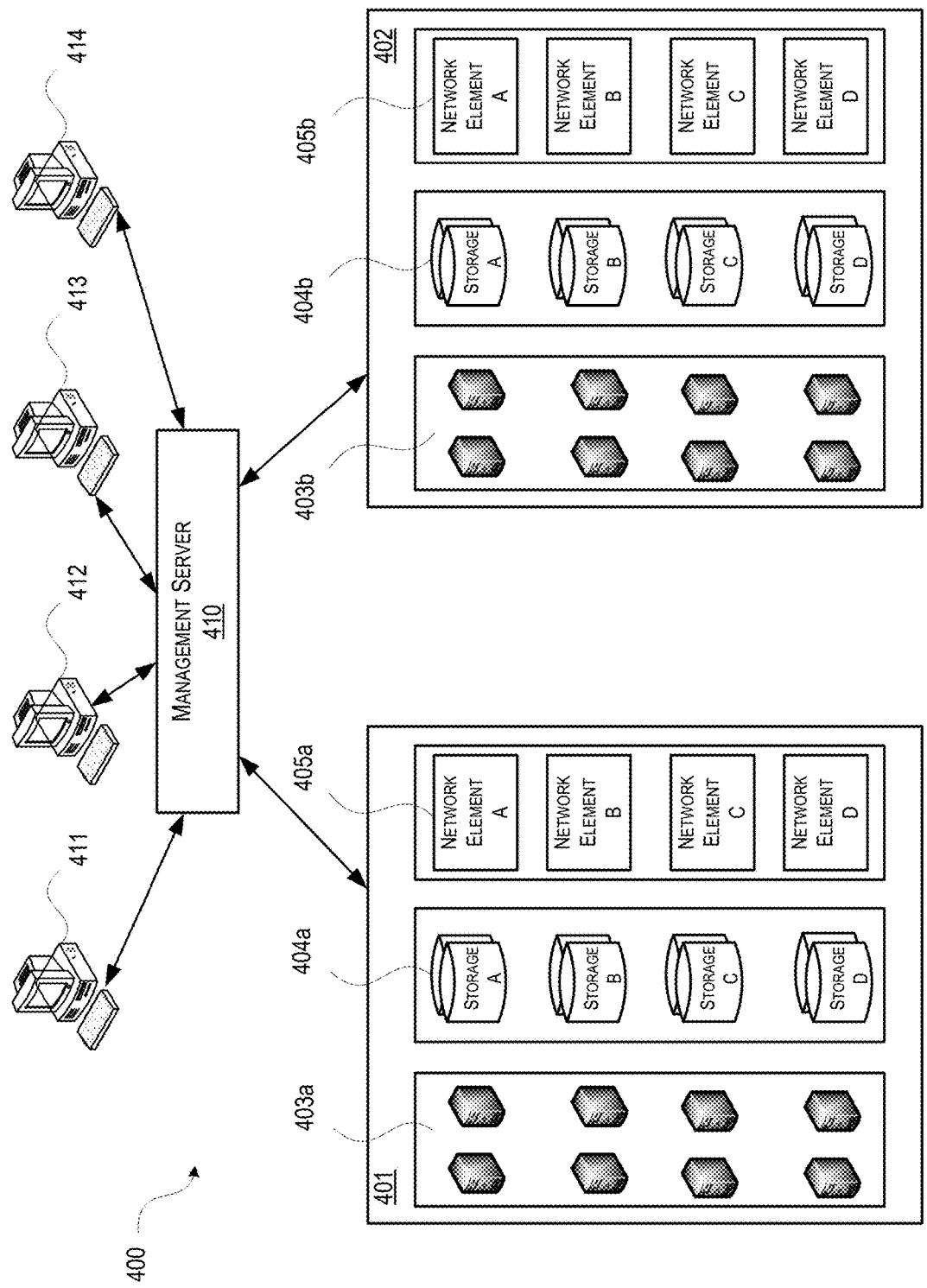
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud messaging server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Messaging server 410 may be implemented on one or more physical servers. The messaging server 410 may run, for example, CLOUDPLATFORM by Citrix Systems, Inc. of Ft. Lauderdale, Fla., or OPENSTACK, among others. Messaging server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Messaging server 410 may be configured to provide user interfaces through which cloud operators and cloud customers may interact with the cloud system 400. For example, the messaging server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The messaging server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to messaging server 410 via the Internet or some other communication network, and may request access to one or more of the computing resources managed by messaging server 410. In response to client requests, the messaging server 410 may include a resource manager configured to select and provision physical resources in the hardware layer of the cloud system based on the client requests. For example, the messaging server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Messaging server 410 may be located at one of the availability zones, or at a separate location. Each zone may include an internal network that interfaces with devices that are outside of the zone, such as the messaging server 410, through a gateway. End users of the cloud (e.g., clients 411-414) might or might not be aware of the distinctions between zones. For example, an end user may request the creation of a virtual machine having a specified amount of memory, processing power, and network capabilities. The messaging server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5:
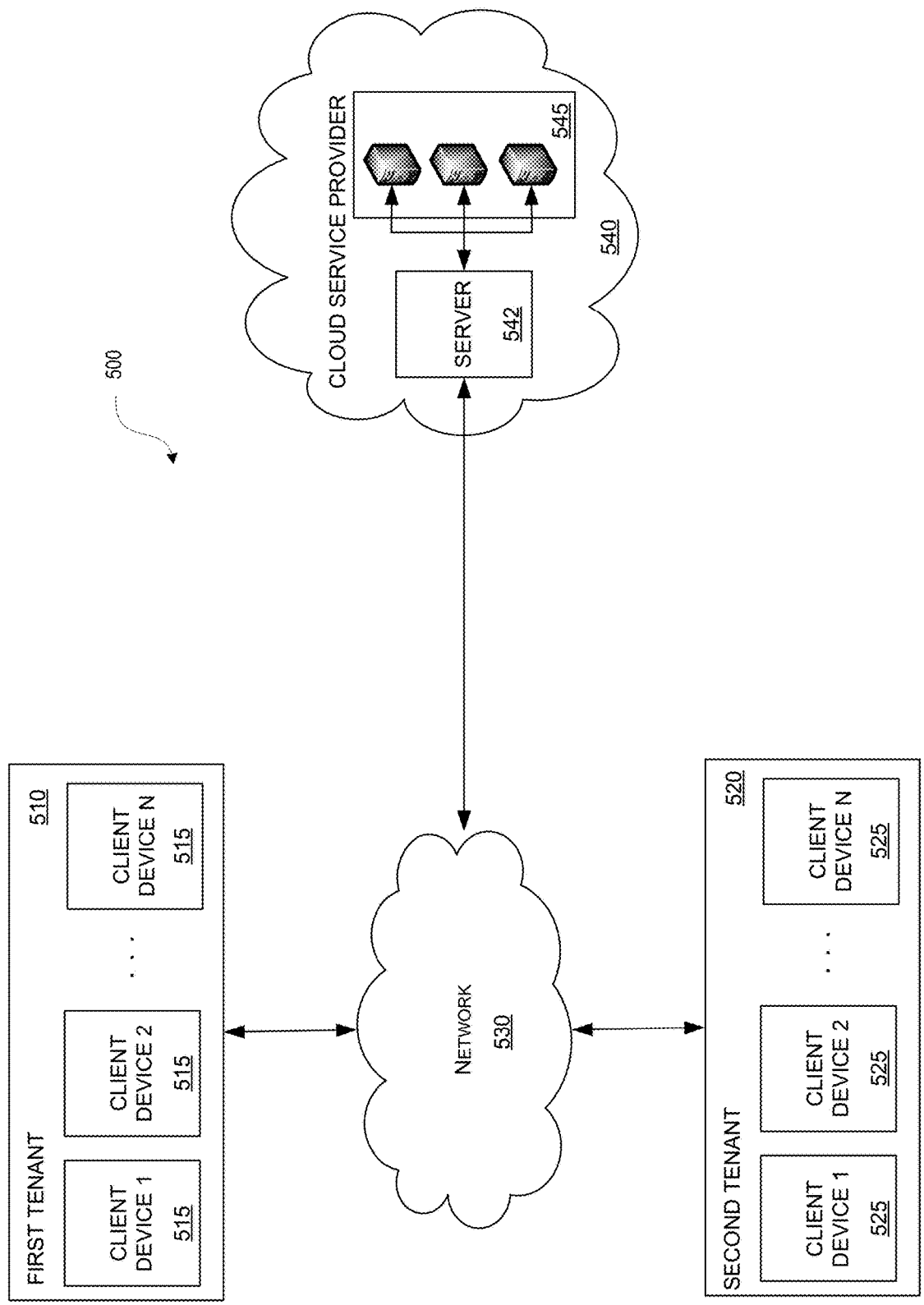
FIG. 5 depicts an illustrative system architecture which may be used for managing messaging between services provided by a cloud-based architecture, according to one or more illustrative aspects described herein.

FIG. 5 depicts an illustrative system architecture which may be used for providing and managing services from a cloud service provider to multiple tenants or customers. As seen in FIG. 5, client devices 515 and 525 may communicate with a messaging server 542 to access the host servers 545 of the cloud service provider 540. The architecture of the system depicted in FIG. 5 is similar in many respects to the architecture of the cloud computing environment 400 described above with reference to FIG. 4 and may include additional features not mentioned above. Some of the components of the cloud computing environment 400 described above with reference to FIG. 4 have been omitted for the sake of simplicity.

The computing environment 500 may include one or more tenants or customers. For example, computing environment 500 may include one or more tenants, such as first tenant 510 (which may, e.g., be a first enterprise and which may be subscribed to the software services provided by cloud service provider 540), and second tenant 520 (which may, e.g., be a second enterprise different from the first enterprise and which may be subscribed to the same software services provided by cloud service provider 540 as first tenant 510.) First tenant 510 may include one or more enterprise users that may be allowed to connect to the cloud service provider 540 via one or more client devices 515. Similarly, second tenant 520 may include one or more enterprise users that may be allowed to connect to the cloud service provider 540 via one or more client devices 525. Client devices 515 and 525 may be any type of computing device capable of receiving and processing input via one or more user interfaces, providing output via one or more user interfaces and communicating input, output, and/or other information to and/or from one or more other computing devices. For example, client devices 515 and 525 may be a server computer, a desktop computer, a laptop computer, a tablet computer, a smart phone, or the like. In addition, the client devices 515 and 525 may be one of the computing devices described above in reference to FIGS. 1, 2, and 4 (e.g., devices 103, 105, 107, 109, 240, and 411-414.)

Computing environment 500 also may include one or more networks, which may interconnect one or more of client devices 515, one or more of client devices 525, messaging server 542, and one or more of host servers 545. For example, computing environment 500 may include network 530, which may include one or more private networks (which may, e.g., be operated by and/or associated with an organization that operates cloud service provider 540 and which may include one or more local area networks, wide area networks, virtual private networks, etc.) and/or one or more public networks (e.g., the Internet).

Referring to FIG. 5, computing environment 500 may include a cloud service provider 540. The cloud service provider 540 may offer tenants, or subscribers, one or more software services. The cloud service provider 540 may install, operate, maintain, and update one or more software applications and services on a catalog comprising one or more host servers 545 and deliver those software applications and services to the users of one or more tenants. Each of the host servers 545 in the catalog may be a single-server or multi-server system, or a cloud-based system, including at least one virtualization server, as described above with reference to FIG. 4.

The cloud service provider 540 may include a messaging server 542. The messaging server 542 may be a single-server or multi-server system, or a cloud-based system, including at least one virtualization server, as described above with reference to FIG. 4. The messaging server may include one or more processors, memory, and one or more communication interfaces (not shown.) The messaging server 542 memory may store and/or otherwise include one or more program modules that include instructions that, when executed by the one or more processors, cause the cloud service provider 540 to perform management functions of the services provided by the cloud service provider. In addition, messaging server 542 communication interfaces may be one or more network interfaces configured to support communication between cloud service provider 540 and network 530 and between messaging server 542 and one or more host servers 545. As described in more detail below, messaging server 542 may also create and manage messaging architectures within the cloud service provider 540 to provide messages between services provided by the cloud. Such messaging architectures may include a multi-tiered architecture that utilizes topics and subscriptions to topics to provide a scalable and secure message passing architecture.

Messaging Architecture

Having discussed several examples of the computing architecture that may be used in providing and/or implementing various aspects of the disclosure, a number of embodiments will now be discussed in greater detail. In particular, and as introduced above, some aspects of the disclosure generally relate to a cloud messaging architecture for passing messages between services of the cloud. In the description below, various examples illustrating a messaging architecture utilizing a primary-secondary relationship between topics of the architecture providing a scalable and secure architecture in accordance with one or more embodiments will be discussed.

The cloud computing environment 500 described herein may provide a messaging architecture for services provided by the cloud to share and receive messages from other services. For example, an enterprise customer, such as first tenant 510, to the cloud service provider 540 may receive various services from the one or more host servers 545. These services may correspond to particular aspects of the first tenants 510 business, such as a first service for payroll, a second service for product development, a third service for customer support, etc. In some instances, these services may exchange information or messages that are used by other services to perform the service function. For example, a new hired employee of the first tenant may have identification information of the employee created by a human resource service provided by the cloud service provider 540. The employee information may then be shared with other services provided by the cloud service provider 540, such as to a payroll service and/or to the particular department associated with the employee. Service messages may thus be shared between services provided to tenants 510 or customers of the cloud service provider 540 to facilitate operation of such services.

Figure 6:
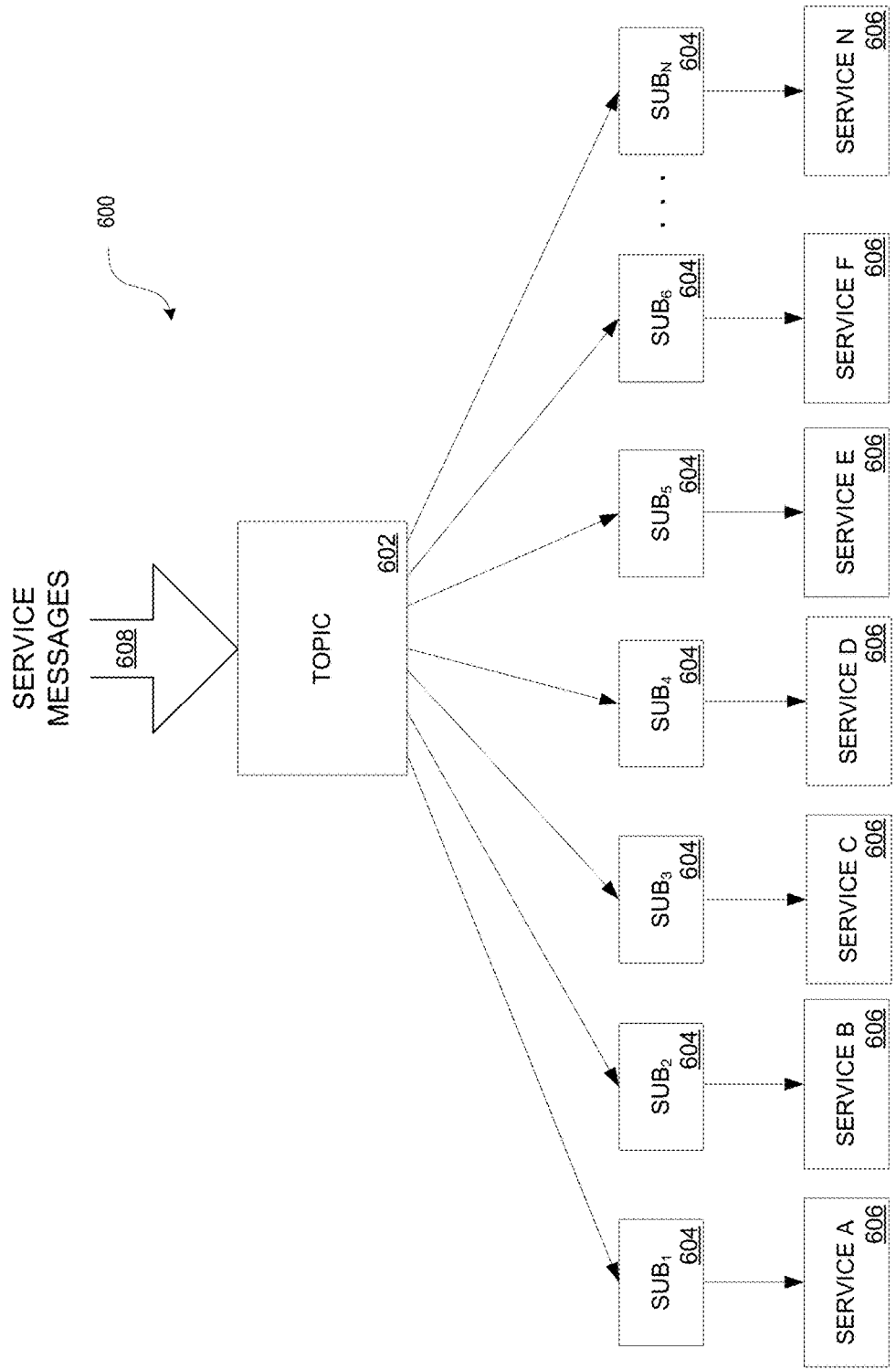
FIG. 6 depicts an illustrative first service messaging architecture for a cloud-based service provider, according to one or more illustrative aspects described herein.

FIG. 6 depicts an illustrative first service messaging architecture 600 for a cloud-based service provider 540, according to one or more illustrative aspects described herein. The service messaging architecture 600 allows two or more entities within a distributed system (such as a cloud-based service provider 540) to exchange messages. In particular, the architecture 600 provides a buffer/subscription model that allows one or more entities to subscribe to a particular topic to receive the service messages transmitted to the topic 602. For example, buffer or topic 602 may be a subscription service that receives particular types of service messages, such as service messages from a first service provided to a tenant or customer of the cloud-based service provider 540. Services messages 608 generated by the first service may be provided to the topic 602 for distribution to other services of the environment 500. Other services or tenants 606 may receive the service messages 608 provided to the topic 602 through a subscription 604 to the topic. In this manner, the messaging architecture 600 may facilitate distribution of service messages to the subscribers to the topic 602 for use by customers 606 subscribed to the topic 602.

For example, a first tenant 510 may receive services from a cloud service provider 540 as described above. Such services may include a first service providing service messages 608 to a second service of the first tenant, such as a product development service receiving service messages from a product support service. The product support service may thus provide one or more service messages 608 to a topic 602 of the architecture 600. The topic 602 may be a message passing service that is generated by the cloud-based service provider 540 in response to a request by the product support service. In one particular instance, the server 542 may generate and maintain the message passing architecture 600 of the cloud service provider 540, including the generation of topics 602. Any number of topics 602 may be generated by the cloud service provider 540 in response to requests by the services provided by the service provider 540. Thus, server 542 may generate a first topic for service A of the first tenant and a second topic for service B of the first tenant, as an example. To receive the product support messages, the product development service (service A 606) may request a subscription 604 to the topic 602 through which the service messages 608 are provided. To subscribe to the topic 602, service A 606 may generate a request to the server 542 of the cloud-based service provider 540 to subscribe to the service messages 608 provided by the product support service. The service provider 540 may, in response, request or instruct the topic 602 to generate a subscription for service A 606. Once subscribed, the service A 606 may begin receiving the service messages 608 associated with the topic 602. Other services 606 may also subscribe to the topic 602 in a similar manner to also receive the service messages 608 of the topic 602.

In one instance, a subscription 604 to a topic 602 may include the generation of a subscription or access key to the topic 602 by the server 542 or other device of the cloud service provider 540. The access key to the topic 602 is provided to each subscribing service 606 for identification of the topic and to verify the identification of the subscribing service. Further, as shown, many subscriptions 604 may be provided for many services 606. In some instances, such services 606 may be for multiple tenants or customers to the cloud-based service provider 540 such that two or more tenants are subscribed to the same topic 602, including both services internal to the cloud service provider 540 and services external to the provider (such as services provided to first tenant 510). Topics 602 may also be limited, in some examples, to the number of subscriptions 604 allocated per topic such that a subscription to a topic may be denied by the server 540 if the maximum number of subscriptions to the topic are already assigned to other services.

As mentioned above, service messages 608 are provided to topic 602 for distribution to services 606 subscribed to the topic through one or subscriptions 604. Receiving services 606 subscribed to the topic 602 may then process the service messages 608. However, some services 606 may fail or otherwise not process incoming service messages 608 from the topic 602. The topic 602, in some instances, maintains service messages 608 for the subscribed services 606 until such messages are processed by the receiving services. As explained in more detail below, services failing to process service messages 608 of a topic 602 may cause a backlog within the topic pipeline which may affect the distribution of service messages to other services subscribed to the topic. For example, the topic 602 may have a limited storage capacity for providing service messages 608 to subscribed services 606, such as 5 Gigabytes. If one or more of the subscribed services fails to process the distributed service messages 608, the storage capacity for the topic 602 may fill up with unprocessed service messages. Additional service messages 608 may not be transmitted through the topic 602 until such capacity is cleared. In this manner, a failed or slow subscribed service 606 may negatively affect the message distribution architecture 600 such that other services may miss one or more service messages 608.

Figure 7:
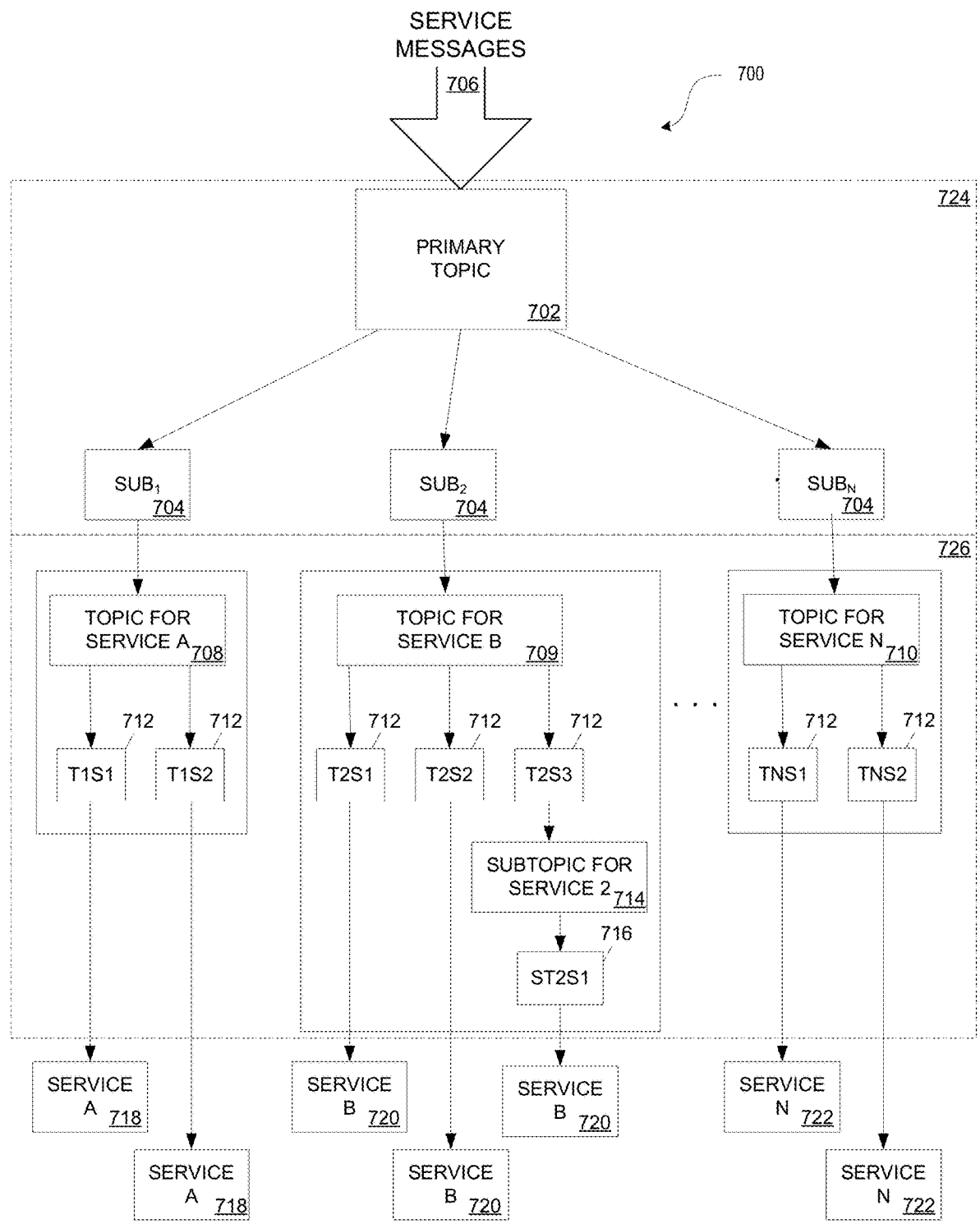
FIG. 7 depicts an illustrative second service messaging architecture utilizing multi-tiering for a cloud-based service provider, according to one or more illustrative aspects described herein.

For at least some of the reasons provided above, FIG. 7 depicts an illustrative second service messaging architecture 700 utilizing primary-secondary relationships for a cloud-based service provider 540, according to one or more illustrative aspects described herein. In the service messaging architecture 700 of FIG. 7, one or more services may be assigned a service topic 706 that subscribes 704 to a primary topic 702 to receive service messages from the primary topic. In this configuration, each service topic 706 may be maintained and configured by the associated service as a secondary topic to the primary topic 702. Several advantages are gained through the multi-tiered service messaging architecture 700 of FIG. 7 over the messaging architecture 600 of FIG. 6, including increased scalability, security, and stability. Such advantages are discussed in more detail below.

Similar to the service messaging architecture 600 of FIG. 6, the multi-tiered service messaging architecture 700 of FIG. 7 includes a primary topic 702 configured to receive service messages 706 from a source (such as an executing service or other program) for distribution to other services of the cloud-based service provider 540. The primary topic 702 is generated and maintained by one or more devices 542 of the cloud-based service provider 540. In one instance, the primary topic 702 may be generated upon a request from a service to share service messages generated by the service to other services of the provider 540. Also similar to above, one or more entities may subscribe 704 to the primary topic 702 to receive the service messages 706. Thus, each entity requests and/or is assigned a subscription 704 to the primary topic 702 through which the service messages 706 are received. In one instance, the primary topic 702 may manage any number of subscriptions 704 from subscribed entities. In another instance, the number of subscriptions 704 to any one primary topic 702 may be limited to a particular threshold value.

In the messaging architecture 700, each subscribing service to the primary topic 702 may include a corresponding service topic 706. More particularly, each service requesting to receive the service messages 706 from the primary topic 702 may subscribe 704 to the primary topic. For example, a first service (service A 718) may request service messages 706 provided by another service, such as a product assistance service requesting service messages from an engineering service. A topic for service A 706 may be created by the server 542 of the cloud environment 540 and the topic for service A may request a subscription 704 to the primary topic 702. The topic for service A 706 may then begin to receive the service messages 706 provided by the primary topic 702. In a similar manner, a service topic 709 for a second service (service B 720) may subscribe 704 to the primary topic 702 to receive the service messages 706, up to N number of service topics 710 subscribing to the primary topic. Thus, each service 718-722 requesting to receive the service messages 706 may receive such messages through a corresponding service topic 708-710 to which the service is subscribed. Further, some instances may include multiple service topics 708-710 subscribed to the primary topic 702 for one service, as explained in more detail below.

Once subscribed, the service topics 708-710 may begin receiving the service messages 706 managed by the primary topic 702. Thus, rather than the services subscribed to the primary topic 702 directly through a subscription 704, a service topic 702 associated with a corresponding service may subscribe to the primary topic to receive the service messages 708. In this manner, the service topics 708-710 may be secondary topics in relation to the primary topic 702 for service message 706 distribution to services of the cloud environment 540. Services, such as service A 718, may subscribe 712 to service topic 706 to begin receiving the service messages 706 from the primary topic 702. For example, a tenant 510 of the cloud environment 540 may employ a service that uses the service messages 706 provided by the primary topic 702. That service may subscribe 712 to the service topic 708 to receive the service messages 706 provided by the primary topic 702 to the service topic through subscription 704. In some instances, any number of services 718 may subscribe to the service topic 706 to receive the service messages provided by the service topic, as described above. In still other instances, one or more of the service topics 708-710 may include a capacity or maximum number of subscriptions 712 that limit the number of subscriptions to the service topic.

The multi-tiered service messaging architecture 700 of FIG. 7 provides many advantages over previous messaging architectures. For example and as explained above, a topic 702 may have a limited storage capacity for providing service messages 706 to subscribed services 704. If one or more of the subscribers 704 fails to process the distributed service messages 706, the storage capacity for the topic 702 may fill up with unprocessed service messages and additional service messages may not be transmitted through the topic until such capacity is cleared. Messaging architectures that include services subscribing directly to a primary topic 702, a failure at any one service may cause the entire messaging architecture to slow or cease transmission of the service messages 706. In the multi-tiered architecture 700 of FIG. 7, a failure of a service to process or clear the provided service messages 706 may only affect the service topic 708-710 associated with that service. Because the service topics 708-710 isolate the primary topic 702 from the processing of the services 718-722, the service messages 706 may continue to be provided to the other services during a service outage. For example, service A 718 may experience a failure in processing service messages 706 received from service topic A 708, causing service topic A to fill the storage of the service topic such that additional service messages may not be provided to the subscriptions 712 to the service topic. However, service messages 706 from the primary topic 702 may continue to be provided to service topic B 709 and service topic C 710 as service topic A 708 isolates the failure of service A 718 from the primary topic. As each service topic 708-710 may also include storage capacity for service messages 706, the overall storage capacity for the messaging architecture 700 may be increased and failures within a subscribing service may be isolated from negatively affecting the receiving of service messages at other services.

The multi-tiered messaging architecture 700 may also improve the security of the messaging service of the cloud environment 540. As mentioned above, access keys are created at the topic level. In particular, services may be provided with access keys that identify the service to the messaging architecture 700 for subscribing to one or more topics of the architecture. In the messaging architecture 600 of FIG. 6, many subscriptions 604 may be provided for many services 606 from a topic 602. Thus, each service 606 may be provided with the same or similar access key that provides access to the subscription 604 to the topic 602. However, if a service 606 is compromised or otherwise loses security over the access key, the compromised topic access key can be used to listen to not only the subscriptions 604 owned by the compromised service, but also the subscriptions owned by other services subscribed to the topic 602. Further, as all of the subscribed services 606 share the same topic 602, it may be difficult to rotate different access keys or alter an access key if one becomes compromised.

Through the multi-tiered messaging architecture 700 of FIG. 7, security over the access keys used to subscribe to topics is improved. In particular, each service topic 708-710 is associated with a unique access key used by services to subscribe to a service topic. Thus, service topic A 708 may use a different access key than service topic B 709, which may use a different access key than service topic C 710. As explained, a service provides the access key for the particular topic to subscribe to that topic. The primary topic 702 may utilize still a different access key than the access keys for service topics 708-710 to allow service topics to subscribe to the primary topic. However, because the services subscribe 712 to a corresponding service topic 708-710, a compromised service key may only affect the corresponding service topic and not the primary topic 702, nor any other service topic. In this manner, a compromised access key may only affect the corresponding service topic 708 such that other service topics 709,710 may continue to utilize uncompromised access keys previously used to subscribe to the service topics. Further, alteration of a compromised access key is simpler in the multi-tiered messaging architecture as only the service subscribed to a particular service topic 708 may receive an updated access key, rather than every service subscribed to the primary topic 702 receiving an updated access key.

The multi-tiered messaging architecture 700 of FIG. 7 provides for the management of service message flows by the services 726 themselves instead of the messaging server 542 of the cloud service provider 540. For example, the messaging server 542 may manage the primary topic 702 and the subscriptions 704 to the primary topic by the service topics 708-710. The management of the primary topic 702 by the cloud service provider 540 is illustrated by box 724 of FIG. 7. Each service, however, may maintain and manage the associated service topic 708 and the subscriptions 712 to the service topic. This provides the services with flexibility in configuring the flow of service messages 706 to the service subscribers 718, as well as control over access keys, number and types of subscribers 718, and the like. Providing control of the service messaging to the services 726 may also reduce the processing strain on the messaging server 542 of the cloud service provider 540 to manage the subscriptions to the primary topic 702.

The use of service topics 708-710 may also increase the scalability of the messaging architecture of the cloud environment 540. As explained above, some instances of messaging topics may be limited in the number of subscriptions that any one topic may support. For example, a topic 702 may be limited to 2000 subscriptions such that a topic may deny a request to a service for a subscription to that topic if the maximum number of subscriptions are reached. The messaging architecture 600 of FIG. 6 may therefore be limited to providing service messages 608 to the first 2000 services that subscribe to the topic 602. However, by using a multi-tiered architecture 700 as illustrated in FIG. 7, the scalability of the messaging architecture for the cloud environment 540 is greatly increased. In particular and extending the example above, because each service topic 708-710 may subscribe 704 to the primary topic 702, 2000 service topics may receive the service messages from the primary topic. However, each of the service topics 708-710 subscribed 704 to the primary topic 702 may have a similar maximum capacity of subscribers as the primary topic 702 such that 2000 services may subscribe to the service topics. Further still and explained in more detail below, one or more sub-service topics 714 may subscribe 712 to a service topic 709, creating another tier of the messaging architecture 700 to which another 2000 services may subscribe 716. In this manner, the multi-tiered messaging architecture 700 may scale to include any number of subscribing services 718-722 through the generation of additional tiers of topics 714.

Still another advantage of a multi-tiered messaging architecture 700 of a cloud service provider 540 is a reduction in the latency for transmitting the service messages 706 to the subscribed services. In the single topic configuration 600 of FIG. 6, the topic 602 provides the service messages 608 to each subscription 604 for forwarding onto the associated service 606. As mentioned, in some instances, a topic 602 may support thousands of such subscriptions 604. Writing each service message 608 to thousands of subscriptions 604 may introduce a latency in receiving such messages, particularly for those subscriptions or services near the end of the subscriptions. For example, the topic 602 may provide the service messages 608 to each subscription 604 one at a time in the order in which the subscriptions were added to the topic. The subscriptions 604 that were the most recently added to the topic 602 would thus wait until a service message 608 is transmitted to each previous subscription before receiving the service message. As more and more subscriptions 604 are added to the topic 602, a longer latency in providing the message to all of the subscriptions is introduced into the architecture. Through the multi-tiered messaging architecture 700, the latency in providing service messages 706 to services 718 may be reduced. In particular, as fewer entities are subscribed 704 to the primary topic 702, the primary topic may provide the service messages 706 at a faster rate to the service topics 708-710. The service topics 708-710 may also include a few subscriptions 712 associated with the service topic. The latency of receiving the service message includes a latency in the primary topic 702 providing the message to the service topic 706 through subscription 704 and the service topic providing the message through subscription 712. This latency may be less in comparison to a subscription waiting for all previous subscriptions to receive the service message 706 before receiving the service message itself.

Figure 8:
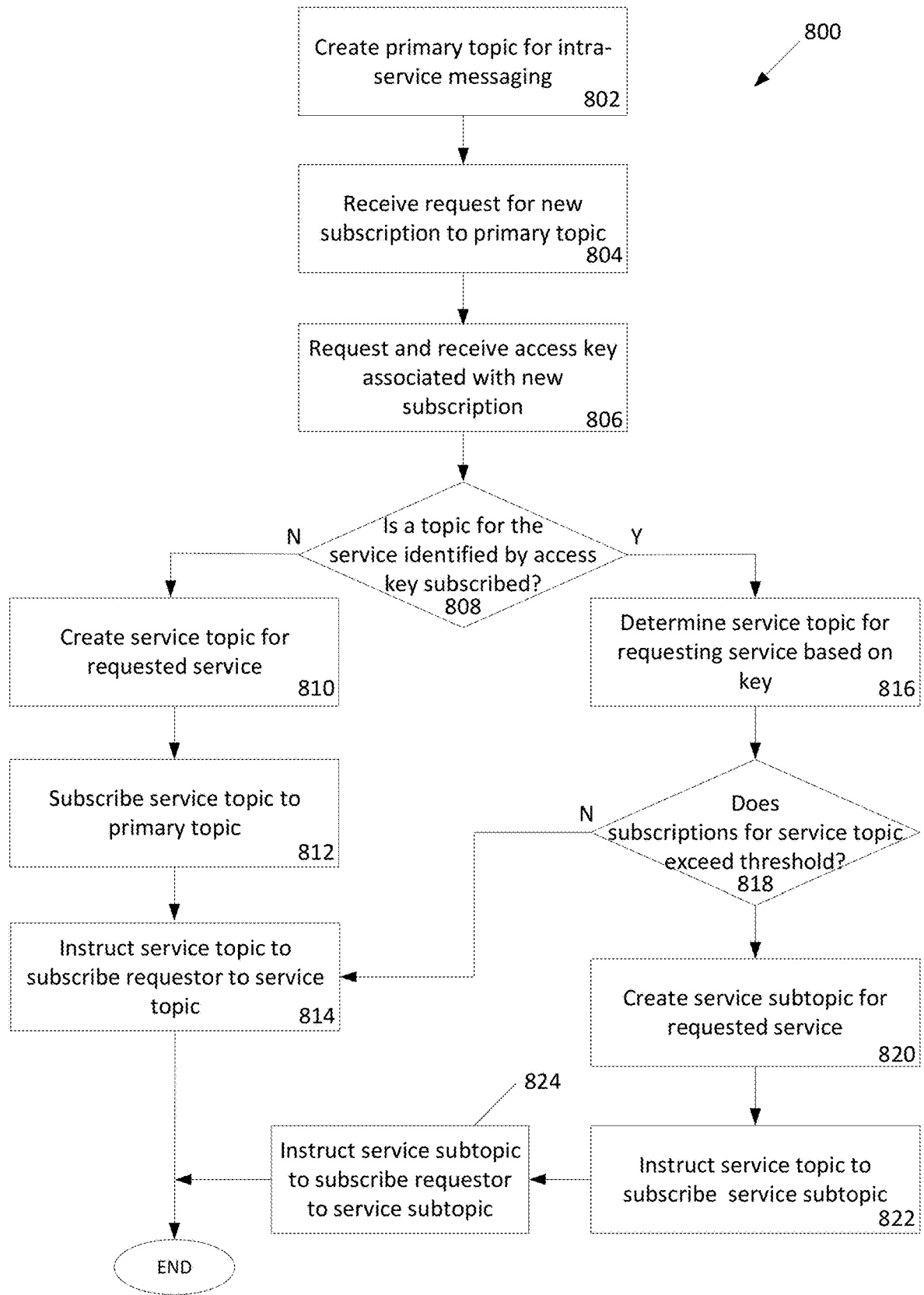
FIG. 8 depicts an illustrative flowchart of a method for creating a service messaging architecture utilizing multi-tiering for a cloud-based service provider, according to one or more illustrative aspects described herein.

FIG. 8 depicts an illustrative flowchart of a method 800 for creating a service messaging architecture utilizing multi-tiering for a cloud-based service provider, according to one or more illustrative aspects described herein. The steps of the method 800 for creating the multi-tiered service messaging architecture may be performed by the messaging server 542 of the cloud service provider 540 discussed above. In other instances, the steps may be performed by other components or devices of the cloud service provider 540 or network 530. Further, one or more services provided by the cloud service provider 540 may include instructions to instantiate one or more topics as described below or otherwise perform one or more steps of the method 800. Reference is made to the messaging architecture 700 of FIG. 7 for clarity, although other messaging configurations or architectures may be generated.

At step 802, a primary topic 702 for service messages 706 may be generated or created for providing the service messages to other services of the cloud service provider 540. As describe above, the primary topic 702 may receive subscriptions 704 through which entities (such as other services or other topics) may receive the service messages for processing. The primary topic 702 may thus act as a gateway through which service messages 706 from one service are provided to other services through a corresponding subscription 704. The cloud service provider 540 may generate the primary topic 702 for any service provided to a tenant of the service provider that generates one or more messages for other provided services.

At step 804, the primary topic 702 may receive a request for a new subscription to receive the service messages provided by the primary topic. For example, the primary topic 702 may receive a request for a subscription 704 from another service of the service provider 540 for the other service to begin receiving the service messages associated with the primary topic. Such service message sharing provides for interoperability of the services provided by the service provider 540 to a tenant or tenants. At step 806, the server 542 may request and receive an access key from the requesting service. As described above, a service access key may be provided to services of the service provider 540 to identify the service and allow a service to subscribe to a topic. The access key may be associated with the primary topic 702 generated above and may be used by the server 542 to identify the requesting service. In some instances, the server 542 may deny the service a subscription 704 to the primary topic 702 based on the access key provided by the requesting service.

At step 808, the server 542 may determine if a topic for the service identified by the access key is subscribed to the primary topic 702. As explained above, one or more service topics 708-710 may subscribe to the primary topic 702 through a subscription 704 to receive the service messages 706. The server 542 may thus determine if a service topic (such as service topic 708) is already subscribed to the primary topic 702. To determine if a service topic 708 is subscribed to the primary topic 702, the server 542 may identify the service requesting to receive the service messages 706. Continuing the above example, the server 542 may receive a request from service A 718 to receive the service messages 706. The server 542 may determine that service topic 706 is already subscribed to the primary topic 702 such that the service topic A receives the service messages 706. In step 816, the server 542 may determine which service topic 708 is associated with the requesting service 718 based on the identification of the service access key provided during the request.

In some instances, a service topic may not be associated with the requesting service to receive the service messages 706. For example, service N 722 may be a new service offered by the cloud service provider 540. The new service N 722 may request to receive service messages 706 from another service provided by the cloud environment 540 by requesting a subscription 704 to the primary topic 702. The server 542 may determine that a service topic corresponding to the requesting service 722 is not subscribed to the primary topic 702. In such instances, the server 542 may create a new service topic (such as service topic N 710) and associate the newly created service topic 710 with the requesting service 722 in step 810. In step 812, the server 542 may subscribe 704 the service topic 710 to the primary topic 702 through which the service topic may receive service messages 706 processed by the primary topic. In this manner, a new service topic 710 may be associated with a requesting service 722 and may be subscribed 704 to the primary topic 702 to begin receiving the service messages 706 provided by the primary topic.

In step 814, the server 542 may instruct the service topic 710 to subscribe the requesting service 722 through a subscription 712. As mentioned above, the service topics 710 may be managed by the services associated with the service topic. Thus, service N 722 may control or otherwise manage the service topic N 710 associated with the service. The instruction provided by the server 542 may thus instruct the service 722 to subscribe the requesting service 722 to the created service topic N 710 as subscriptions to the service topic may be controlled and managed by the corresponding service. Other entities or devices may control the creation and management of the service topics 708-710 associated with a service 718-722, including server 542 or any other component of the cloud service provider 540.

Through the operations above, a service topic 710 may be generated for providing service messages 706 to a requesting service 722. Thus, service topic N 710 may receive service messages 706 from primary topic 702 through subscription $SUB_N$ 704. The requesting service 722 may be subscribed to the service topic 710 through a subscription (such as subscription TNS1 722) to also receive the service messages 706. The multi-tiered messaging architecture 700 provides the service messages 706 to the requesting service 722 while obtaining the advantages over previous messaging architectures outlined above.

Returning to step 808, the server 542 may determine that a service topic corresponding to the requesting service is already subscribed to the primary topic 702 and, in step 816, the server may determine which service topic is associated with the requesting service based on the identification of the service access key provided during the request. For example, the server 542 may receive a request from service B 720 to begin receiving the service messages 706. The server 542 may determine that service topic B 709 is subscribed to primary topic 702 and that service B 720 is associated with the service topic B based on the access key provided by service B. At step 818, the server 542, service B 720, or any other entity managing the messaging for service B may determine if the number of subscriptions 714 for the identified service topic 709 is equal to or exceeds a threshold value of subscriptions to the service topic. As described above, some service topics or primary topics may include a capacity or limit on the number of subscriptions to the topic to receive the service messages. When the number of subscriptions to a topic nears the topic capacity, additional subscriptions to the topic may not be created for additional subscribers. Instead, an additional topic tier may be generated for the service topic to provide additional capacity for the service. The threshold value for determining when the number of subscriptions nears a capacity of a topic may be any value. For example, the threshold value may be the capacity subscriptions for the topic minus X, where X is any number. The threshold value may be used to ensure that the subscription capacity of the topic is not reached and one or more service subtopics may be subscribed to the parent service topic.

Continuing the above example, it may be determined that the capacity for the service topic B 709 has not be reached and an instruction may be provided to the service topic to subscribe the requesting service 720 at step 814, as described above. In some instances, however, the number of subscriptions issued for a topic may be nearing the capacity for the service topic B 709 of the requesting service 720. At step 820, a service subtopic 714 may be created and, at step 822, the service subtopic 714 may be subscribed to the service topic 709 through subscription T2S3 712. Through subscription T2S3 712, the service subtopic 714 may receive service messages from service topic 709 in a similar manner as the service topic 709 receives the service messages from the primary topic 702 through subscription $Sub_2$ 704.

In step 824, the service subtopic 714 may receive an instruction from the service or other managing component to subscribe the requesting service 720 to the created service subtopic 714 through a subscription 716. Once subscribed to the service subtopic 714, the service 720 may receive the service messages 706. In this manner, additional tiers of topics may be generated within services to increase the capacity of the messaging architecture 700 to provide service messages to the services of the cloud service provider 540. Thus, the service messages 706 may be provided from the primary topic 702 to the service topic 709 through subscription 704, from the service topic to the service subtopic 714 through subscription 712, and from service subtopic to the service 720 through subscription 716. The tiered messaging architecture 700 provide advantages over previous messaging architectures for providing service messages 706 to services 720 of a cloud service provider 540.

Figure 9:
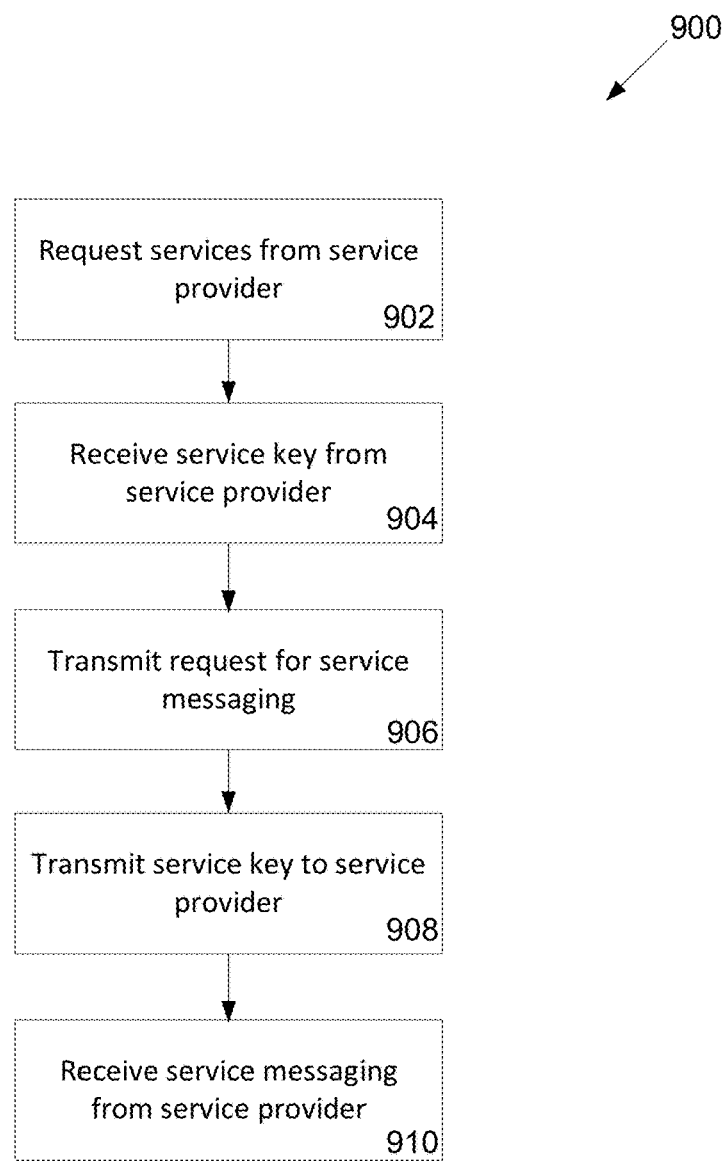
FIG. 9 depicts an illustrative flowchart of a method for requesting messaging service from a cloud-based service provider, according to one or more illustrative aspects described herein.

FIG. 9 depicts an illustrative flowchart of a method 900 for requesting messaging service from a cloud-based service provider 540, according to one or more illustrative aspects described herein. The steps of the method 900 may be performed by one or more clients or tenants of a cloud service provider 540 or network 530 requesting services or access to service messages generated through the cloud service provided. Reference is made to the messaging architecture 700 of FIG. 7 for clarity, although other messaging configurations or architectures may be generated.

Beginning in step 902, a tenant 510 to a cloud service provider 540 may request a service. As described above, the cloud service provider 540 may provide any cloud-based services and such services may include the use of service messages from one or more services provided by the cloud service provider. In step 904, the tenant 510 may receive an access key from the cloud service provider 540 for accessing one or more services from the provider. In some instances, the access key may identify the tenant 510 and/or a service provided by the cloud service provider 540.

At step 906, a service utilized by the tenant 510 may request access to one or more service messages. As described above, services provided by the cloud service provider 540 may use messages from other services provided by the cloud for inter-service communication. Such messages may be provided through a cloud service messaging architecture. Services may thus transmit a request to the cloud provider 540 for access or subscriptions to messages from other services provided by the cloud. In step 908, the tenant 510 may transmit the access key to the cloud provider 540 that identifies the service requesting the service messages. As explained above, the access key may be used by the cloud service provider 540 to determine the identity of a requesting service and any service topics 708 associated with the requesting service subscribed to a primary topic 702. At step 910, the service utilized by the tenant 510 may receive the requested service messages from the cloud service provider 540. From the perspective of the tenant 510, the multi-tiered messaging architecture 700 appears as any other service messaging architecture as the tiers are managed by the service provider 540 and the services themselves, as described above.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
   a cloud management server comprising a primary buffer configured to transmit service messages of a first service of a cloud service provider to one or more other services of the cloud service provider via one or more primary subscriptions of the primary buffer; and
   one or more processors; and
   a memory storing computer-readable instructions that, when executed by the one or more processors, configure the one or more processors to implement:
   a service management system comprising at least one secondary service buffer subscribed to the primary buffer via a corresponding primary subscription of the one or more primary subscriptions, wherein the one or more processors are configured to generate the at least one secondary service buffer by:
   determining, based on receiving a request from a second service of the cloud service provider to receive the service messages of the first service, whether the second service is subscribed to receive the service messages of the first service; and
   generating the at least one secondary service buffer based on determining that the second service is not subscribed to receive the service messages of the first service.

2. The system of claim 1, wherein:
   the primary buffer is generated, based on a request received from the first service of the cloud service provider to share service messages of the first service with the one or more other services of the cloud service provider, and
   the at least one secondary service buffer is configured to transmit the service messages of the first service received from the primary buffer to one or more service subscriptions of the at least one secondary service buffer.

3. The system of claim 2, wherein:
   the at least one secondary service buffer corresponds to the second service of the cloud service provider, and
   the second service receives the service messages from the at least one secondary service buffer via a corresponding service subscription of the one or more service subscriptions.

4. The system of claim 1, wherein the service management system further comprises at least one sub-secondary service buffer subscribed to the at least one secondary service buffer via a corresponding service subscription of the one or more service subscriptions, and wherein the at least one sub-secondary service buffer is configured to transmit the service messages received from the at least one secondary service buffer to one or more sub-service subscriptions of the sub-secondary service buffer.

5. The system of claim 4, wherein a third service of the cloud service provider receives the service messages from the sub-secondary service buffer via a corresponding sub-service subscription of the one or more sub-service subscriptions.

6. The system of claim 1, wherein the first service is associated with a first tenant of the cloud service provider and the second service is associated with a second tenant of the cloud service provider.

7. The system of claim 1, wherein the service management system transmits a first service identifier to the cloud management server to subscribe the at least one secondary service buffer to the primary buffer via the corresponding primary subscription of the one or more primary subscriptions.

8. The system of claim 7, wherein the second service transmits a second service identifier to the service management system to subscribe the second service to the at least one secondary service buffer, the second service identifier different than the first service identifier.

9. The system of claim 8, wherein the cloud management server receives a request from the second service to receive the service messages of the first service, the request comprising the second service identifier, and transmits a subscribe instruction to the service management system to subscribe the second service to the at least one secondary service buffer via a corresponding service subscription of one or more service subscriptions of the at least one secondary service buffer.

10. A method comprising:
  determining, based on receiving a request from a second service of a cloud service provider to receive service messages of a first service, whether the second service is subscribed to receive the service messages of the first service; and
  based on determining that the second service is not subscribed to receive the service messages of the first service:
  generating, at a service management server associated with the second service, a service buffer configured to transmit the service messages of the first service received from a primary buffer via one or more service subscriptions of the service buffer;
  subscribing, via a first of one or more primary subscriptions, the service buffer to the primary buffer; and
  transmitting a subscribe instruction to the service management server to subscribe the second service to the service buffer via a first of the one or more service subscriptions of the service buffer.

11. The method of claim 10, further comprising:
  based on receiving a request from the first service of the cloud service provider to share the service messages of the first service with one or more other services of the cloud service provider:
  generating, at a cloud management server, a primary buffer configured to transmit the service messages of the first service of the cloud service provider to the one or more other services of the cloud service provider via the one or more primary subscriptions of the primary buffer.

12. The method of claim 10, wherein the request from the second service of the cloud service provider to receive the service messages of the first service comprises a service identification key comprising an identification of the second service.

13. The method of claim 12, further comprising:
  identifying the second service based at least on the service identification key; and
  associating the second service with the service buffer.

14. The method of claim 12, further comprising:
  receiving a second request from the second service of the cloud service provider to receive the service messages of the first service, the second request comprising the service identification key;
  determining an association of the second service with the service buffer; and
  transmitting a second subscribe instruction to the service management server to subscribe the second service to the service buffer via a second of the one or more service subscriptions of the service buffer.

15. The method of claim 10, further comprising:
  comparing a sum of the one or more service subscriptions of the service buffer to a threshold value of available subscriptions of the service buffer; and
  generating, at the service management server associated with the second service and based on the comparing, at least one sub-service buffer configured to transmit service messages received from the service buffer via one or more sub-service subscriptions of the sub-service buffer.

16. The method of claim 15, further comprising:
  subscribing the sub-service buffer to the service buffer via one of the one or more service subscriptions of the service buffer; and
  subscribing the second service to the sub-service buffer via another one of the one or more service subscriptions of the service buffer.

17. The method of claim 10 further comprising:
  transmitting the service messages of the first service of a the cloud service provider to the second service via the service buffer.

18. One or more non-transitory computer-readable media storing computer-executable instructions that, when executed by a computer system comprising at least one processor, and at least one memory, cause the computer system to perform a method comprising:
  determining, based on receiving a request from a second service of a cloud service provider to receive service messages of a first service, whether the second service is subscribed to receive the service messages of the first service;
  based on determining that the second service is not subscribed to receive the service messages of the first service:
  instantiating, at a service management server associated with the second service of the cloud service provider, at least one service buffer configured to transmit the service messages of the first service, received by a primary buffer, to the second service via one or more service subscriptions of the service buffer; and
  generating a communication session, via a first of the one or more service subscriptions, between the service buffer and the primary buffer;

transmitting a subscribe instruction to the service management server to subscribe the second service to the service buffer via a first of the one or more service subscriptions of the service buffer; and based on receiving a request from a first service of a cloud service provider to share the service messages of the first service with one or more other services of the cloud service provider:

instantiating, at a cloud management server, the primary buffer configured to transmit service messages of the first service of the cloud service provider via one or more primary subscriptions of the primary buffer.

19. The one or more non-transitory computer-readable media of claim 18, having additional computer-executable instructions stored thereon that, when executed, further cause the computer system to:

compare a sum of the one or more service subscriptions of the service buffer to a threshold value of available subscriptions of the service buffer; and generate, at the service management server associated with the second service and based on the comparing, at least one sub-service buffer configured to transmit the service messages received from the service buffer via one or more sub-service subscriptions of the sub-service buffer;

subscribe the sub-service buffer to the service buffer via one of the one or more service subscriptions of the service buffer; and subscribe the second service to the sub-service buffer via the one of the one or more service subscriptions of the service buffer.

20. The one or more non-transitory computer-readable media of claim 18, wherein the request from the second service of the cloud service provider comprises a service identification key comprising an identification of the second service, and the instructions further cause the computer system to:

identify the second service based at least on the service identification key;

associate the second service with the service buffer;

generate the service identification key;

associate the service identification key with the second service of the cloud service provider; and transmit the service identification key to the second service.

* * * * *